United States Patent [19]

Meitner

[11] E Patent Number: Re. 31,885

[45] Reissued Date of Patent: May 14, 1985

[54] MICROFIBER OIL AND WATER WIPE

[75] Inventor: Gary H. Meitner, Winneconne, Wis.

[73] Assignee: Kimberly-Clark Corporation, Neenah, Wis.

[21] Appl. No.: 563,713

[22] Filed: Dec. 20, 1983

Related U.S. Patent Documents

Reissue of:

[64] Patent No.: 4,307,143
Issued: Dec. 22, 1981
Appl. No.: 170,904
Filed: Jul. 21, 1980

U.S. Applications:

[63] Continuation-in-part of Ser. No. 1,744, Jan. 8, 1979, abandoned, and a continuation-in-part of Ser. No. 843,001, Oct. 17, 1977, abandoned.

[51] Int. Cl.[3] ..... A47L 13/17; B32B 3/00; D04H 1/04

[52] U.S. Cl. ..... 252/91; 15/104.93; 252/174.21; 428/156; 428/195; 428/198; 428/219; 428/220; 428/288; 428/289; 428/296; 428/903

[58] Field of Search ..... 15/104.93; 252/89 R, 252/90, 91, 538, 557, 174.21, 549; 156/219, 220; 264/293; 428/88, 89, 156, 158, 159, 171, 195, 198, 219, 220, 284, 286, 288, 289, 296, 903

[56] References Cited

U.S. PATENT DOCUMENTS

| | | | |
|---|---|---|---|
| 2,999,265 | 9/1961 | Duane et al. | 252/91 |
| 3,088,158 | 5/1963 | Boyle et al. | 252/91 |
| 3,624,224 | 11/1971 | Watchung et al. | 15/104.93 |
| 3,795,571 | 3/1974 | Prentice | 428/198 |
| 3,827,857 | 8/1974 | Boulus | 15/104.93 |
| 3,978,185 | 8/1976 | Buntin et al. | 264/93 |

*Primary Examiner*—Bruce H. Hess
*Attorney, Agent, or Firm*—William D. Herrick; R. Jonathan Peters; Howard Olevsky

[57] ABSTRACT

Low cost wiper material for industrial and other applications having improved water and oil wiping properties. A base material of meltblown synthetic, thermoplastic microfibers is treated with a wetting agent and may be pattern bonded in a configuration to provide strength and abrasion resistance properties while promoting high absorbency for both water and oil. The wiper of the invention displays a remarkable and unexpected ability to wipe surfaces clean of both oil and water residues without streaking. It may be produced in a continuous process at a low cost consistent with the convenience of single use disposability.

4 Claims, 5 Drawing Figures

MICROFIBER OIL AND WATER WIPE

Matter enclosed in heavy brackets [ ] appears in the original patent but forms no part of this reissue specification; matter printed in italics indicates the additions made by reissue.

REFERENCE TO RELATED APPLICATIONS

This is a continuation-in-part of copending application Ser. No. 1,744 filed Jan. 8, 1979, now abandoned, a continuation-in-part of Serial No. 843,001 filed Oct. 17, 1977, now abandoned.

BACKGROUND OF THE INVENTION

1. Field of the Invention

The present invention relates to wipers for industrial and other applications involving the absorption of water and/or oily materials. The many uses for such wipers include auto repair cleanup, lithographic plate processing, hand wiping, and many others. For such uses it is desirable to have a single material that wipes well for both oil and water residues. Further, since wiping is, in many cases, a hand labor step, it is also desired to obtain a wiper that wipes clean with a minimum effort, preferably on the first application. Finally, cloth wipers, which are most prevalent in industrial applications today, must be reused for economy and, as a result, are subject to pilferage and laundry costs. It is, therefore, desirable to obtain an improved wiper at a cost consistent with single use and disposability.

2. Description of the Prior Art

Many forms of wipers are available for various applications. In general, however, prior wipers can be classified as either paper or cloth. The paper wipers, while inexpensive, are suited primarily for use in wiping aqueous materials and not entirely satisfactory for use with oil. On the other hand, cloth wipers, while suitable for wiping both oils and water, are expensive and must be laundered. In addition, unless care is taken in laundering, water absorption rates for cloth wipers can be adversely affected. Some nonwoven wipers made from rayon which may also include other ingredients such as pulp, for example, and other synthetic materials have been available, but, in general, fail to provide good wiping properties with both oil and water and may entail a cost that prevents disposability except in special applications. Finally, sponges, both natural and synthetic, are in widespread use for wiping but are even more expensive.

Examples of prior wipers within these broad classifications are contained in the following U.S. patents which are intended to be representative and not exhaustive: U.S. Pat. No. 3,477,084 to Thomas, U.S. Pat. No. 3,520,016 to Meitner, U.S. Pat. No. 3,546,056 to Thomas, U.S. Pat. No. 3,650,882 to Thomas, and U.S. Pat. No. Re. 27,820 to Politzer et al.

The preparation of polyolefin microfiber webs is also known and described in Wente, Industrial and Engineering Chemistry, Volume 48, Number 8 (1965) pages 1342 through 1346 as well as U.S. Pat. No. 3,978,185 to Buntin et al, U.S. Pat. No. 3,795,571 to Prentice and U.S. Pat. No. 3,811,957 to Buntin. The Buntin et al patent further discloses that mats of meltblown polyolefins are useful as wiping cloths and hydrocarbon absorption material. However, the wipers as described in these publications each are deficient to a significant degree in one or more of the following properties: cost, combined oil and water wiping, clean wiping, or physical properties.

SUMMARY

The present invention provides a unique, low cost wiper having an improved combination of water and oil wiping properties. It is formed from a low basis weight web of synthetic, thermoplastic microfibers treated with a wetting agent and may be pattern bonded. The type and amount of wetting agent as well as the particular bonding patterns are selected to result in an unexpected degree of water and oil absorption while producing a unique ability to wipe clean in most cases with a single wiping action. This contrasts with wipers of the prior art which display usefulness primarily with respect to either water or oil and which require multiple wipings to remove all residue. In a particularly preferred embodiment the wipers are produced by embossing at a pressure of at least 20 psi and a temperature in the range of 180° F. to 245° F. The wipers of the present invention find particular application in industrial uses such as lithographic plate processing, machine maintenance and repair, and food handling, but many other applications will be apparent to those skilled in this art.

DESCRIPTION OF THE PREFERRED EMBODIMENT

Figure 1:
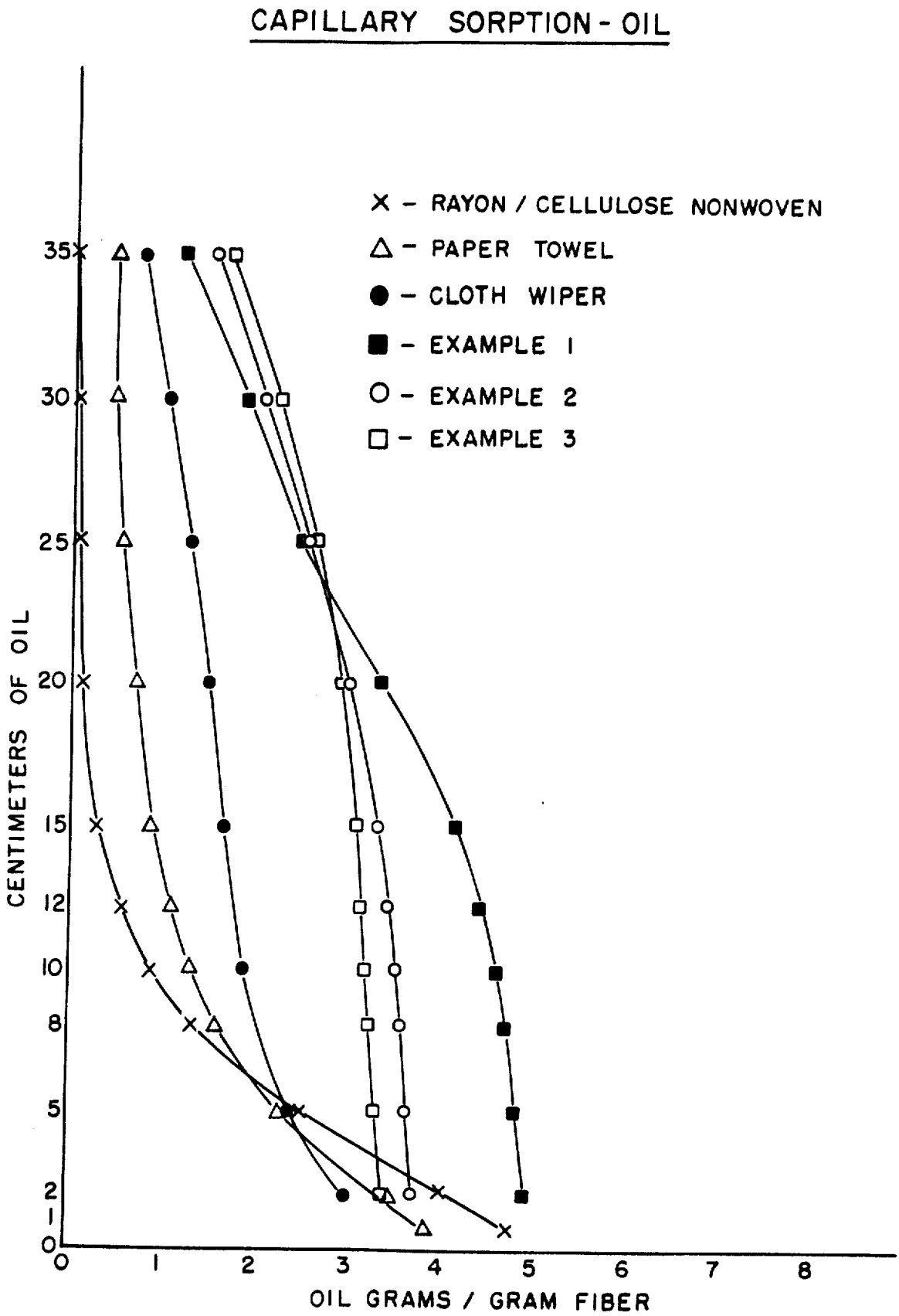
FIG. 1 is a graph of capillary sorption comparisons for known wiping materials and various wipers of the present invention.

While the invention will be described in connection with preferred embodiments, it will be understood that it is not intended to limit the invention to those embodiments. On the contrary, it is intended to cover all alternatives, modifications, and equivalents as may be included within the spirit and scope of the invention as defined by the appended claims.

The invention will be described in reference to certain tests carried out on the material of the invention as well as conventional wipers. These tests are performed as follows:

Trapezoidal tear results were obtained essentially in accordance with ASTM D2263 #34, page 483, part 24, ASTM Test Methods. An Instrom tester was used equipped with a 1 inch by 3 inch jaw grip with the longer dimension perpendicular to the direction of load application. A trapezoidal template was used having parallel sides 1 inch and 4 inches long with a 3 inch height and a 15 mm cut in the 1 inch side. Five 3 inch by 6 inch samples are prepared with a tear in the "machine" direction and five with a tear in the "cross" or opposite direction. The tear is made by cutting as in the template. The Instron load range is selected such that the break will normally occur between 10% and 90% of full scale load, and the sample is clamped along nonparallel sides with the cut midway between. The crosshead is moved until the sample ruptures or the return limit is reached. The maximum and minimum tearing loads are reported for each sample group of five, and the average reported as the tearing load.

Oil absorbency rate results were obtained essentially in accordance with Federal Specification UU-P-316, Mar. 3, 1949, Method 180 and UU-T-5956 dated Apr. 4, 1967. A 4 inch square specimen is placed on a wire screen and a syringe filled with white mineral oil at about 73° F. is held at an angle of about 30° from horizontal with its tip nearly touching the specimen. Exactly 0.1 ml of oil is applied to the center of the specimen keeping the syringe tip in drop and the time measured from start of flow to the point when the sample no longer reflects light when viewed at an angle. Five measurements were taken and the average reported.

Tensile results were obtained essentially in accordance with ASTM D-1117-74. Samples 4 inches by 6 inches are prepared with 5 each having at its length in the "machine" and "cross" directions. An Instron machine is used having one jaw face 1 inch square and the other 1 inch by 2 inches or larger with the longer dimension perpendicular to the direction of load. At a crosshead speed of 12 inches per minute, the full scale load was recorded and multiplied by a factor as follows: Readings (lbs.): 2, 5, 10, 20, 50; factors (respectively): 0.0048, 0.012, 0.024, 0.048, 0.120. The results were reported in energy (inches/lbs.).

Softness results were obtained by Handle-O-Meter readings under standard conditions of about 50% relative humidity and 73.5° F. The instrument was calibrated and two 6 inch square samples prepared. Using the 0.50 inch slot with curved plates and with the opening and blade aligned, each sample was centered and the maximum reading recorded as grams of force per specimen width. Readings were taken in "machine" and "cross" directions on each sample and averaged.

Capillary sorption pressure results were obtained essentially as described in Burgeni and Kapur, "Capillary Sorption Equilibria in Fiber Masses", Textile Research Journal, May 1967, pp. 356-366. A filter funnel was movably attached to a calibrated vertical post. The funnel was movable and connected to about 8 inches of capillary glass tubing held in a vertical position. A flat, ground 150 ml. Buchner form fitted glass medium Pyrex filter disc having a maximum pore diameter in the range of 10-15 microns supported the weighed sample within the funnel. The funnel was filled with Blandol white mineral oil having a specific gravity in the range of 0.845 to 0.860 at 60° F. from Whitco Chemical, Sonneborn Division, and the sample was weighed and placed under 0.4 psi pressure on the filter. After one hour during which the meniscus is maintained constant at a given height starting at 35 cm., the sample was removed, weighed, and grams per gram absorbed calculated. The height was adjusted and the process repeated with a new sample until a height of 1 cm. was reached. The results were plotted as in FIGS. 1-4. In general, results obtained below 10 cm. oil indicate oil contained within large web voids and are not characteristic of wiper performance. Results obtained above 15 cm. oil are most significant as representing oil absorbed within the fibers which will be retained and is an important measure of wiper performance.

Oil residue removal was determined by applying several drops of Blandol white mineral oil including 0.5% duPont oil red to a Lucite bar 18 inches by 2-9/16 inches by ¾ inch fitted with a 4 inch by 2-9/16 inch top slide. Using a roller the oil was spread until evenly distributed. The 2½ inch by 8 inch sample was wrapped about the slide and a 0.4 lb/in$^2$ weight placed on top. The sample and slide were pulled across the bar at a uniform rate, and the oil remaining on the bar washed off with mineral spirits into a 600 ml. beaker. The residue was then transferred [quantitively] *quantitatively* into a 50 ml. volumetric flask and the volume adjusted to 50 ml. with mineral spirits. The flask was then placed in a colorimeter absorption cell and the percent transmittance measured at a wavelength of 5250 A. The amount of oil residue was obtained from a calibration curve derived from tests run using known oil weights. The procedure was repeated five times and an average taken.

Water residue was obtained using a Lucite slide 3.2 inches wide by 4 inches in length with a notched bottom adapted to receive a sample and slide along a 2 inch wide glass plate of 17.8 inches length. In carrying out the test a 2.5 inch by 8 inch strip of the material to be tested was wrapped around the Lucite slide and taped in place. The notched slide was then positioned at one end of the glass slide, and a 5 pound weight placed on top. Using a 0.5% water solution of diphenyl fast scarlet 4 Ban dye, from Geigy Dyestuff, the plate surface was wetted by pipetting about three 0.4 ml. drops spaced about two inches apart and centered along the remaining length of the plate. The slide plus the weight and sample was then pulled along the plate in a smooth, continuous motion. The dye solution remaining on the plate was then rinsed into a beaker using distilled water and diluted to 50 ml. in a volumetric flask. The residue was then determined by transmittance at 525 mμ using a Bausch & Lomb Spectronic 20 or calculated as follows:

$$\text{residue (g.)} = \log (\%\ T) - 2.0079 / -3.5108$$

Except where indicated otherwise, meltblown polyolefin webs produced for the wipers of the present invention were manufactured in accordance with the process described in U.S. Pat. No. 3,978,185 to Buntin et al which is incorporated herein by reference in its entirety and to which reference may be made for details of the meltblowing process.

The invention will now be described in terms of specific examples illustrating the various embodiments.

EXAMPLES 1-10

Meltblown microfiber webs were formed in accordance with the process described in U.S. Pat. No. 3,978,185 to Buntin et al as follows: for Examples 1-8, polypropylene resin having a melt index of 14-16, measured at 190° C. using 2161 g load and identified as Hercules PC 973 was used. For all but Examples 7 and 8, production was at a rate of 2.5 [lbs. per hour] *lbs. per inch per hour*, and collected at a distance of 14 inches on a forming screen. Examples 7 and 8 were produced at a rate of 2.0 [lbs. per hour] *lbs. per inch per hour* and collected at 21 inches. For Examples 9 and 10, polyethylene terephthalate polyester resin having an inherent viscosity of 0.45-0.64 and melting point of 252° C. with 0.1% $TiO_2$ by weight and identified as Eastman Chemical Products T-2 was used. In Examples 1, 4, 7, and 9, the meltblown filaments were integrated into a web as formed. Examples 2, 3, 5, 6, 8 and 10 include pattern bonding steps. In Examples 1-6, dioctylester of sodium sulfosuccinic acid wetting agent was applied to the web in a quench spray as the web was formed in an amount of 0.3% by weight. The timing and manner of wetting agent addition are not considered critical. The webs are further described in the following Table I that also includes the results of physical tests performed on the webs.

TABLE I

| Example | 1 | 2 | 3 | 4 | 5 | 6 | 7 | 8 | 9 | 10 |
|---|---|---|---|---|---|---|---|---|---|---|
| Resin | PP | PP | PP | PP | PP | PP | PP | PP | PE | PE |
| Basis Weight (oz/yd²) | 2.5 | 2.5 | 2.5 | 3.5 | 3.5 | 3.5 | 3.0 | 3.0 | 2.0 | 2.0 |
| Bonding | U | RHT* | D** | U | RHT* | D** | U | RHT* | U | RHT* |
| % Bond Area | — | 10.2 | 11.8 | — | 10.2 | 11.8 | — | 10.2 | — | 10.2 |
| Pins/in² | — | 153 | 100 | — | 153 | 100 | — | 153 | — | 153 |
| Temp °F. | — | 190 | 190 | — | 190 | 190 | — | 190 | — | 190 |
| Pin Height (in.) | — | 0.045 | 0.030 | — | 0.045 | 0.030 | — | 0.045 | — | 0.045 |
| Properties | | | | | | | | | | |
| Trap. Tear (lbs) | 2.0 | 2.0 | 2.2 | 2.7 | 3.9 | 3.4 | 1.5 | 1.2 | 1.0 | 0.8 |
| Bulk (in.) | 0.040 | 0.035 | 0.030 | 0.054 | 0.043 | 0.041 | 0.072 | 0.041 | 0.030 | 0.024 |
| Grab Tensile (lbs.) | 6.4 | 12.8 | 10.8 | 4.7 | 15.9 | 17.0 | 3.9 | 12.7 | 3.1 | 4.3 |
| Softness | | | | | | | | | | |
| MD (—) | 23.6, 32.2 | 30.0, 39.6 | 16.2, 24.8 | 44.0, 50.0 | 61.0, 63.2 | 78.2, 83.0 | 46.8, 30.2 | 56.0, 30.0 | 9.8, 9.8 | 6.8, 9.2 |
| CD (—) | 16.0, 33.0 | 32.0, 15.6 | 30.0, 15.2 | 29.2, 47.8 | 61.5, 65.2 | 43.8, 42.0 | 24.0, 41.2 | 20.8, 50.0 | 11.8, 9.8 | 14.4, 13.6 |

*Pattern as illustrated in U.S. Design Pat. No. 239,566
**Pattern as illustrated in U.S. Pat. No. 3,855,046

The various materials produced in the foregoing examples were tested for oil absorbency rate, water absorbency rate, and residue removal as were the following materials representative of conventional wipers: a conventional cotton cloth wiper having a basis weight of 6.3 oz/yd², an air formed rayon and cellulose fiber nonwoven wiper having a basis weight of 4.2 oz/yd², and a paper wiper having a basis weight of 2.5 oz/yd² available under the trademark KIMTOWELS. The results of these tests are shown in the following Table II.

TABLE II

| Sample Properties | Ex 1 | Ex 2 | Ex 3 | Ex 4 | Ex 5 | Ex 6 | Ex 7 | Ex 8 | Ex 9 | Ex 10 | Cotton Cloth | Rayon NW | Paper |
|---|---|---|---|---|---|---|---|---|---|---|---|---|---|
| Oil Absorbency Rate | 3.5 sec. | 4.9 sec. | 7.4 sec. | 3.6 sec. | 5.8 sec. | 4.7 sec. | 2.6 sec. | 6.3 sec. | 4.5 sec. | 5.6 sec. | 1.3 sec. | 1.2 sec. | 3.2 sec. |
| Oil Residue | 0.026 g. | 0.021 g. | 0.021 g. | 0.026 g. | 0.023 g. | NA | NA | NA | 0.032 g. | 0.032 g. | 0.039 g. | 0.089 g. | 0.035 g. |
| Water Absorbency Rate | 0 sec. | 3.4 sec. | 3.0 sec. | 0 sec. | 0 sec. | 0 sec. | 2 min. + | 2 min. + | 2 min. + | 2 min. + | 4.7 sec. | 4.5 sec. | 1.4 sec. |

Figure 2:
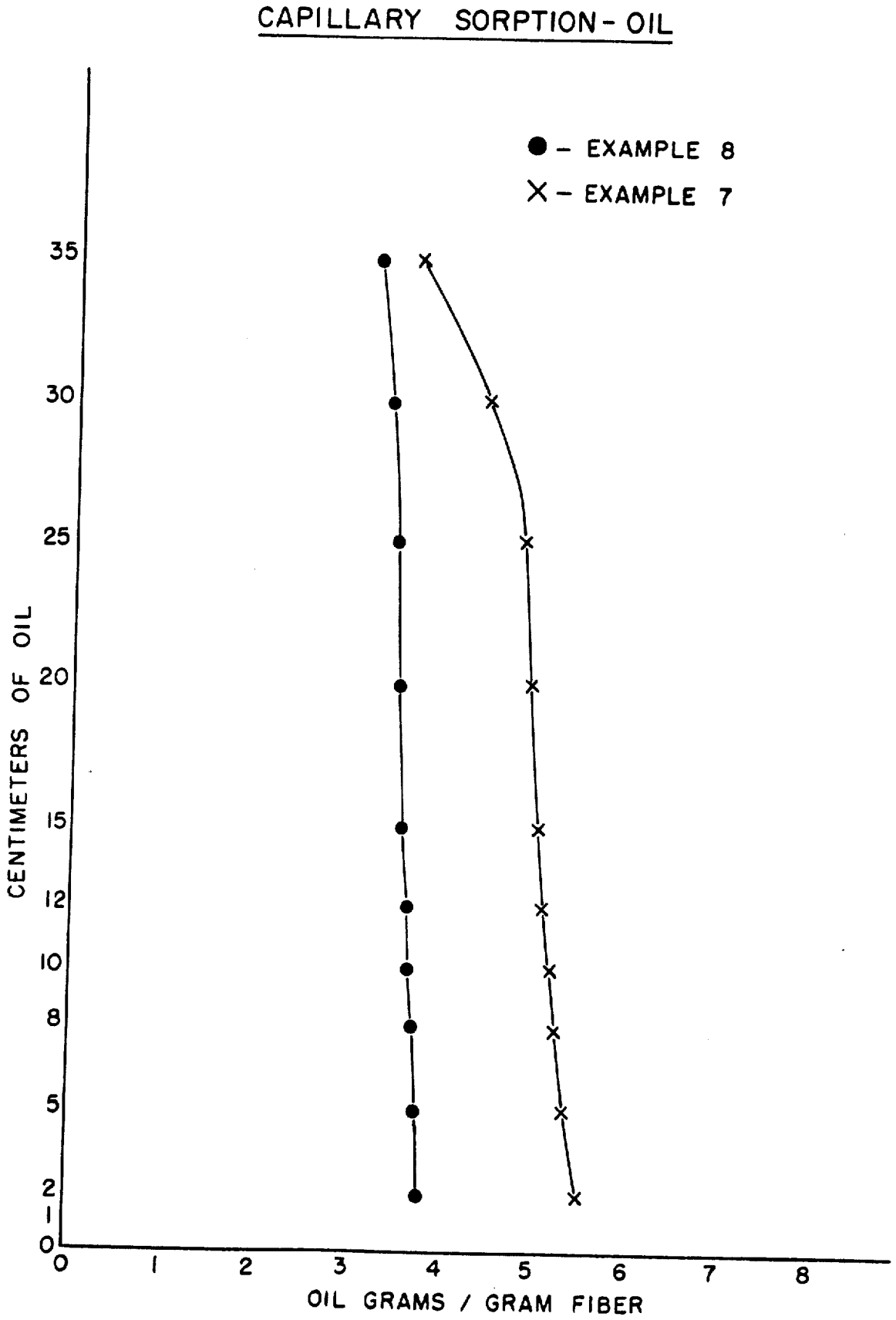
FIG. 2 is a capillary sorption graph comparing bond patterns.
Figure 3:
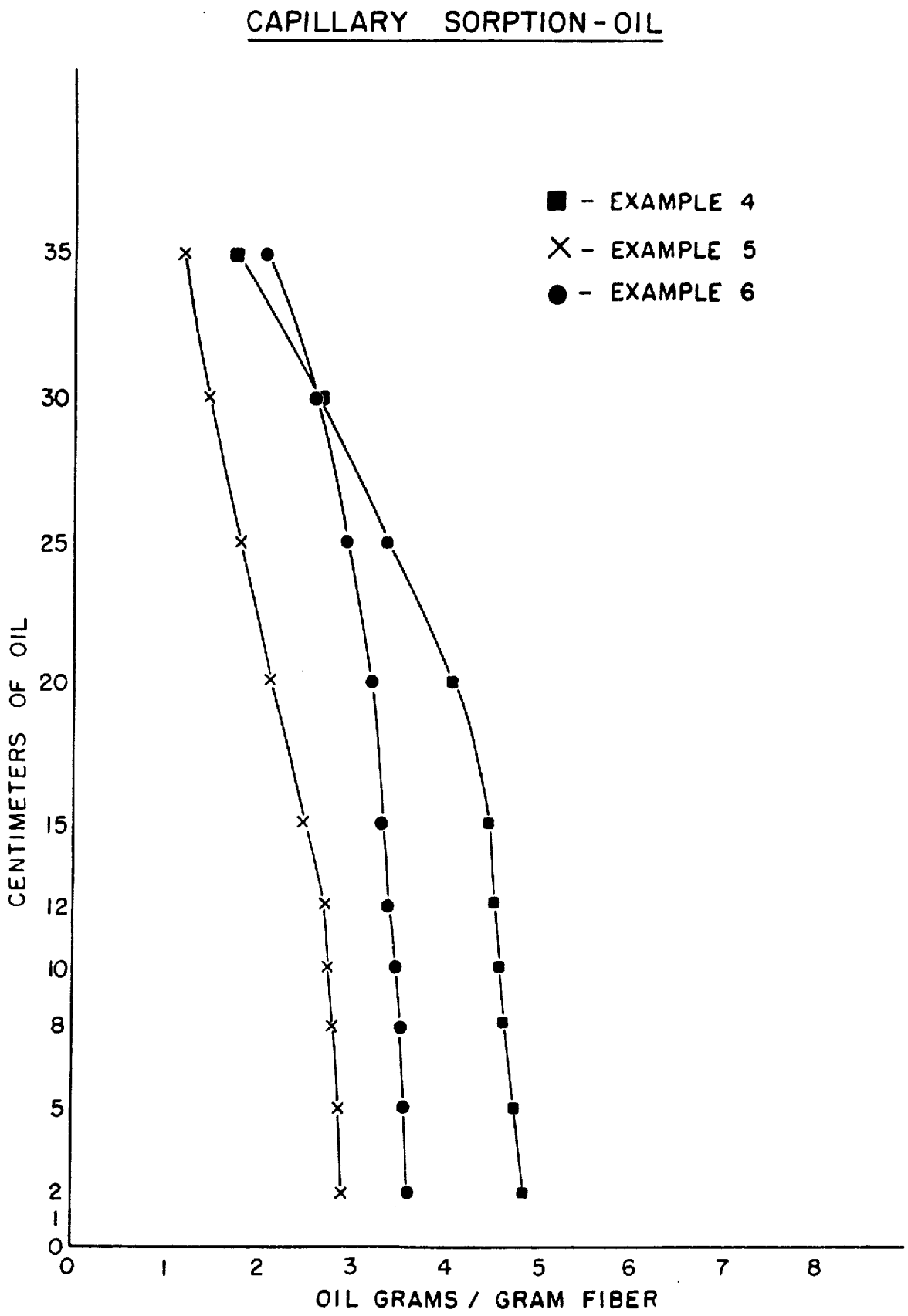
FIG. 3 is a capillary sorption graph comparing basis weights.
Figure 4:
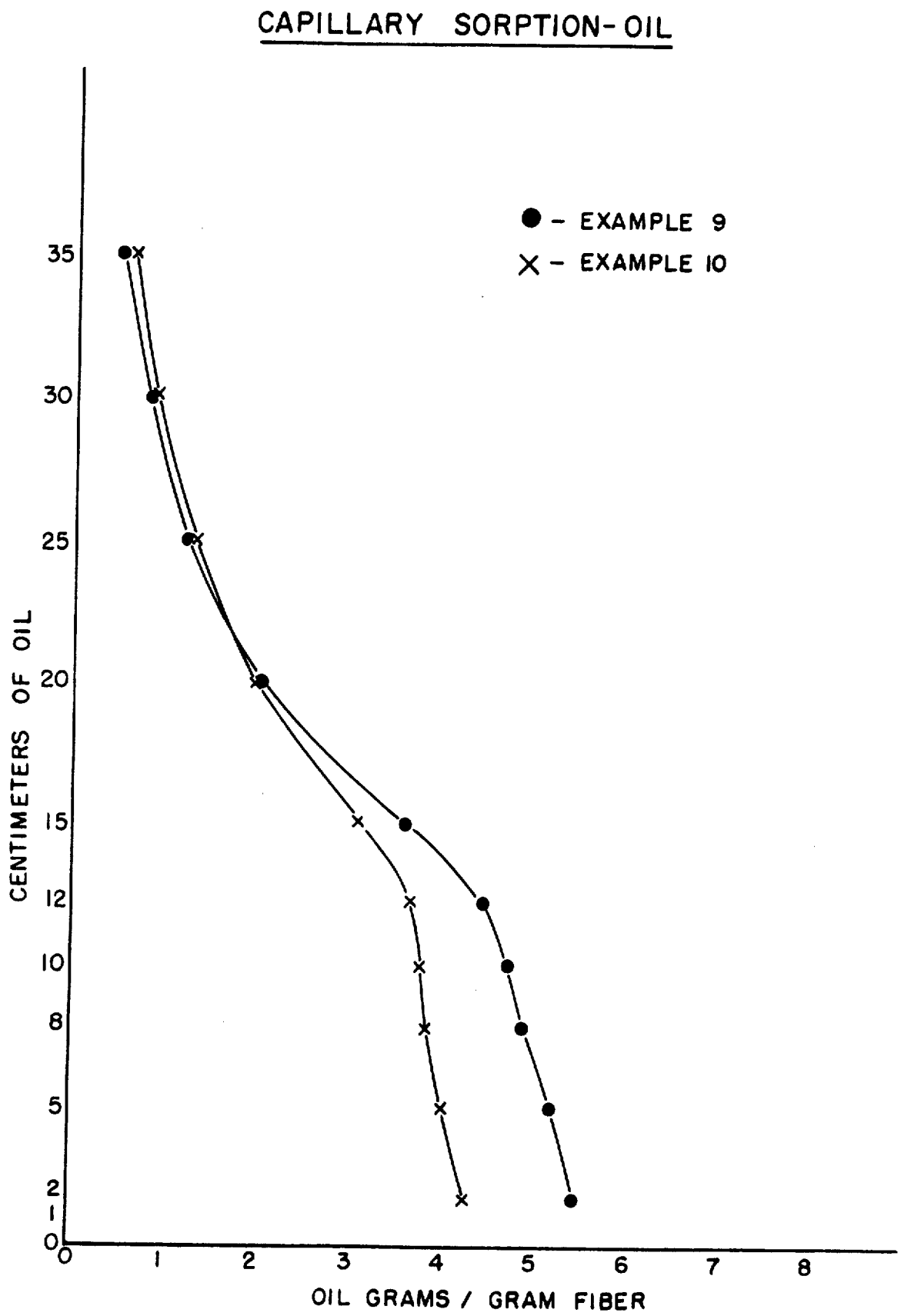
FIG. 4 is a capillary sorption graph comparing polyester webs.

The results of capillary sorption tests are shown in FIG. 1 which illustrates the improvement obtained with the wiper of the present invention. FIG. 2 illustrates oil capillary sorption tests comparing bonding patterns. As shown, pattern bonding has a slight adverse effect on capillary sorption, but, in many cases, this is acceptable in view of the benefits obtained in improved appearance, grab tensile, and other properties such as abrasion resistance, particularly since performance is still improved over other wiping materials. The RHT pattern is preferred as resulting in improved appearance and physical properties. FIG. 3 demonstrates the effect of increased basis weight on capillary sorption. As shown, at higher basis weights the gram per gram absorbency is somewhat lower. FIG. 4 illustrates capillary sorption results for polyester showing that the benefits are not as great as with polypropylene but that the adverse effects of pattern bonding are less pronounced. Polypropylene is, therefore, a preferred material for the wipers of the present invention.

The comparison of oil absorbency and water absorbency rates demonstrates that the use of a wetting agent has a remarkable effect on water absorbency rates while having only a slight effect on oil absorbency. To obtain the benefits of the invention the wetting agent is preferably applied in an amount to produce 0.1 to 0.6% by weight on the finished web although the range of 0.1 to 1.0% is useful. Thus, in accordance with the invention, the advantages of a synthetic polymer oil wipe can be retained in a wiper that is water absorbent as well.

Figure 5:
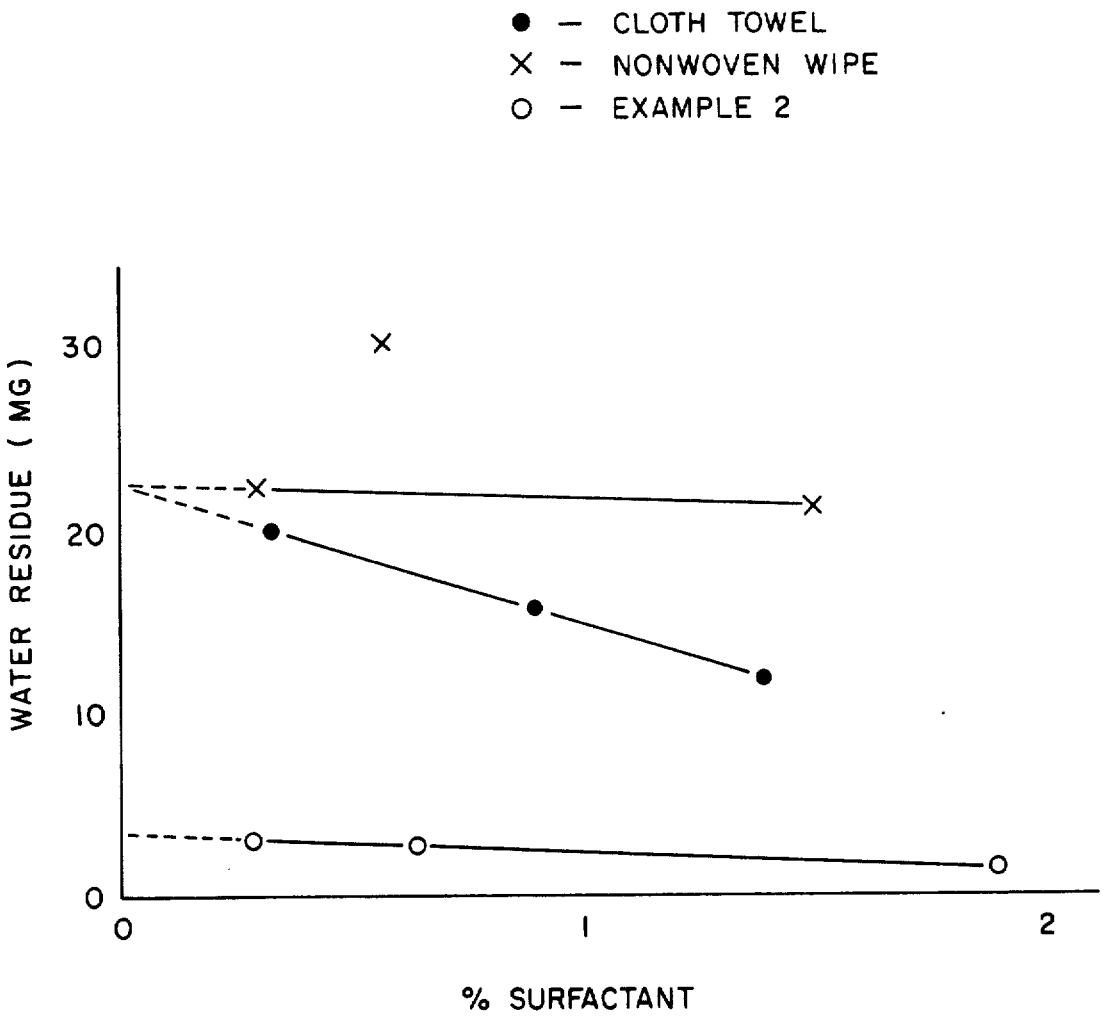
FIG. 5 is a graph comparing water wiping film residue properties.

FIG. 5 illustrates the improved water wiping characteristics of the wiper of the present invention in terms of water residue as measured by the test procedure described above. As shown, the wiper of the present invention was superior to the cloth and another nonwoven wiper, both of which left water residue several times greater than that left by the wiper of the present invention. FIG. 5 also demonstrates that little improvement is obtained by addition of surfactant (Aerosol OT) in excess of the preferred range.

The comparison of capillary sorption tests demonstrates the dramatic improvement in absorbency obtainable in accordance with the invention. For example, FIG. 1 shows that at 15 cm. pressure of oil, wipers of the invention contain at least about double and up to 15 times as much oil as conventional wiping products on an equal weight basis. As a result, wipers can be fabricated either on a lower basis weight to contain equal amounts of wiping capacity or at equal basis weights to conventional wipers with higher wiping capacity.

The comparison of residue removal demonstrates that the wiper of the present invention provides a remarkably clean oil wiping material and can result in significantly reduced wiping times and labor costs especially in industrial uses. Similar results are obtainable with water.

To obtain the advantages of the present invention the wetting agent is preferably selected from the following surface active agents: anionic compositions such as dioctylester of sodium sulfosuccinic acid (Aerosol OT).

and nonionic compositions such as isooctyl phenypolyethoxy ethanol (Triton X-100 and X-102). Also the fibers are preferably polyolefin microfibers having an average diameter in the range of up to about 10 microns. The bond pattern comprises a density of the range of from about 20 to 250 pins/in$^2$ and preferably within 50 to 225 pins/in$^2$ with a percent area bond coverage in the range of from about 5 to 25%. For optimum cost/performance combinations the wipers of the invention preferably have a basis weight in the range of from about 1.5 to 3.5 oz/yd$^2$ although the range of from about 1 to 4.5 oz/yd$^2$ is useful. As shown, a wipe with these characteristics produces the highly unexpected beneficial results in addition to its economy of manufacture and use.

To demonstrate the effect of embossing conditions, material produced as in Example 2 was embossed under the temperature conditions of 160° F., 200° F., 245° F. and 280° F. at pressures of 10 psi, 30 psi, and 50 psi for each temperature. *(Embossing pressures may be converted to pounds per lineal inch by multiplying the psi value by 5.02 pounds per lineal inch - psi for a roll face of 14 inches and diameter of 7.25 inches for example.)* Test results for absorbency abrasion (5=low abrasion, 1=high abrasion resistance), grab tensile, trapezoidal tear and bulk were as follows:

TABLE III

| Capillary Suction Pressure-Oil @ 10 cm Grams Oil/Gram Fiber | | | | Comparative Abrasion Resistance | | | | Grab Tensile-Pounds | | | |
|---|---|---|---|---|---|---|---|---|---|---|---|
| Temp. | 10 psi | 30 psi | 50 psi | Temp. | 10 psi | 30 psi | 50 psi | Temp. | 10 psi | 30 psi | 50 psi |
| 160° F. | 4.61 | 4.55 | 4.61 | 160° F. | 5 | 4 | 3 | 160° F. | 4.6 | 8.5 | 9.5 |
| 200° F. | 4.15 | 4.26 | 4.17 | 200° F. | 5 | 3 | 3 | 200° F. | 7.8 | 9.7 | 9.5 |
| 245° F. | 3.63 | 3.73 | 3.74 | 245° F. | 4 | 2 | 2 | 245° F. | 9.5 | 9.8 | 9.9 |
| 280° F. | 3.77 | 3.82 | 3.69 | 280° F. | 2 | 1 | 1 | 280° F. | 9.7 | 10.0 | 9.5 |

5 4 3 2 1

Low Abrasion Resistance — High Abrasion Resistance

| Trap Tear-Pounds | | | | Ames Bulk-Inches | | | |
|---|---|---|---|---|---|---|---|
| Temp. | 10 psi | 30 psi | 50 psi | Temp. | 10 psi | 30 psi | 50 psi |
| 160° F. | 1.76 | 2.05 | 2.18 | 160° F. | 0.037 | 0.036 | 0.035 |
| 200° F. | 1.95 | 1.70 | 1.92 | 200° F | 0.034 | 0.034 | 0.034 |
| 245° F. | 1.71 | 1.85 | 1.89 | 245° F. | 0.031 | 0.032 | 0.032 |
| 280° F. | 1.27 | 1.31 | 1.34 | 280° F. | 0.030 | 0.031 | 0.031 |

The foregoing shows that best results are obtained under embossing conditions of at least 20 psi and 180° F. to 245° F.

While other nonwoven wipers have achieved satisfactory performance with either oil or water, the wiper of the present invention is excellent in both applications. The addition of a wetting agent to a wiper of thermoplastic hydrophobic fibers would be expected to increase wetting out of the surface being wiped of water. This is extremely undesirable in, for example, restaurant applications where customers may be faced with a wet counter even after wiping. In contrast, the wiper of the present invention wipes clean both oily and aqueous substances with a minimum of residue making it useful for many applications in diverse areas such as restaurants and auto repair shops. While it is not desired to limit the invention to any theory, it is believed that the pore size of the microfiber webs of the invention reduces the adverse effect of wetting agent addition by retaining aqueous liquids with a minimum effect on the oil wiping capability of the webs. The results are particularly apparent in wiping surfaces such as stainless steel that are especially subject to spotting and streaking. As shown by the residue tests, dramatic improvement in residue removal is obtained with the wipers of the invention.

Thus it is apparent that there has been provided, in accordance with the invention, a wipe material that fully satisfies the objects, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A wiper that is both oil and water absorbent and having a reduced tendency to leave streaks and spots consisting essentially of a melt blown polypropylene web having a basis weight in the range of from about 1.5 to 3.5 oz. per square yard and containing about 0.1 to 0.6% by weight of a wetting agent selected from the group consisting of dioctylester of sodium sulfosuccinic acid and isooctyl phenylpolyethoxy ethanol and formed from fibers having an average diameter in the range of up to 10 microns, said wiper having been embossed under conditions of at least 20 psi pressure at a temperature in the range of 180° F. to 245° F.

2. The wiper of claim 1 wherein said web is pattern bonded with a bond density in the range of from about 50 to 225 pins per square inch and a bond area coverage in the range of from about 5 to 25%.

*3. A wiper that is both oil and water absorbent and having a reduced tendency to leave streaks and spots consisting essentially of a melt blown polypropylene web having a basis weight in the range of from about* 1.5 to 3.5 oz. per square yard and containing about 0.1 to 1.0% *by weight of a wetting agent selected from the group consisting of dioctylester of sodium sulfosuccinic acid and isooctyl phenylpolyethoxy ethanol and formed from fibers having an average diameter in the range of up to 10 microns, said wiper having been embossed under conditions of at least 20 psi pressure at temperature in the range of 180° F. to 245° F.*

*4. The wiper of claim 3 wherein said web is pattern bonded with a bond density in the range of from about 50 to 225 pins per square inch and a bond area coverage in the range of from about 5 to 25%.*

* * * * *